United States Patent [19]

Berg

[11] 4,307,939
[45] Dec. 29, 1981

[54] OSCILLATING RETROREFLECTOR

[75] Inventor: Charles A. Berg, Buckfield, Me.

[73] Assignee: Pyreflex Corporation, Buckfield, Me.

[21] Appl. No.: 147,373

[22] Filed: May 7, 1980

[51] Int. Cl.³ .............................................. G02B 5/12
[52] U.S. Cl. ........................................ 350/99; 350/6.6
[58] Field of Search ................. 350/99, 102, 315, 292, 350/202, 103, 109, 319, 6.6, 1.6, 1.1, 1.7; 250/267, 368, 474

[56] References Cited

U.S. PATENT DOCUMENTS

| | | | |
|---|---|---|---|
| 3,574,448 | 4/1971 | Paine | 350/102 |
| 3,621,467 | 11/1971 | Dostal | 350/99 |
| 3,952,217 | 4/1976 | Rawlings | 350/6.6 |
| 4,065,204 | 12/1977 | Lipkins | 350/102 |
| 4,073,568 | 2/1978 | Heasley | 350/102 |
| 4,082,414 | 4/1978 | Berg | 350/1.7 |
| 4,160,577 | 7/1979 | Berg | 350/103 |

Primary Examiner—John K. Corbin
Assistant Examiner—B. W. de los Reyes
Attorney, Agent, or Firm—Kenway & Jenney

[57] ABSTRACT

Disclosed is apparatus for reflecting incident radiative energy back to a source. The apparatus features at least two planar reflecting facets which intersect at an angle and which are mounted for adjustment of the angle between the adjacent facets. The facets are oscillated in phase to sweep the angle between $\pi/2$ and $\pi/2-\delta$ radians. The angle $\delta$ is selected so that the plane of maximum areal energy density crosses the plane which includes the source. This apparatus thus compensates for the effects of dispersion with known retroreflectors.

13 Claims, 14 Drawing Figures

OSCILLATING RETROREFLECTOR

BACKGROUND OF THE INVENTION

This invention relates to retroreflectors and more particularly to oscillating retroreflectors for sweeping the plane of maximum reflected areal energy density through the plane of the source of radiative energy.

A retroreflector is a device which reflects incident radiative energy back toward its source. A well known retroreflector includes three planar reflecting facets mounted substantially at right angles to one another. Such a retroreflector is known as a corner cube reflector and has the property that any ray which is reflected off each of the three orthogonal surfaces will return to the source along a ray parallel to its path of incidence. It is important to note that an incident ray will be returned along a path parallel to the incident ray but not coincident with the ray. It is for this reason that the reflected energy directed toward the source is dispersed. That is, with a conventional corner cube retroreflector, the areal density of the reflected energy at the source is lower than the areal density of the incident beam upon the corner cube reflector. With a corner reflector having facets aligned precisely at $\pi/2$ radians, the areal density of the reflected radiation at the source is one-fourth the areal density at the plane of the retroreflector. This dispersion of the reflected energy often severely limits the usefulness of retroreflectors because of the difficulty in detecting the diffuse reflected energy at the location of the source.

One application for retroreflectors has been in the field of surveying. In such a case light from a source is reflected from a corner reflector back in the direction of the source, the reflected light is detected, and the travel time to the retroreflector and back to the source used as an indication of the distance between the source and the retroreflector. In some cases the light source is a laser. Because the photodetector used to detect the reflected light is governed by quantum effects, the photodetector may not respond at all if the areal density of the reflected radiation is too low. The range over which such surveying apparatus can be used, therefore, is limited because of this dispersion effect. Retroreflectors have also been used for precisely locating aircraft and ships. In such a case, the aircraft or ship has retroreflectors mounted on board which are adapted for reflecting electromagnetic radiation of a frequency used for radar interrogation. As before, with conventional retroreflectors the areal density of the reflected radiation is at best one-fourth the areal density of the radiation at the plane of the retroreflector. This dispersion effect may result in the return signals being undetectable. In general, therefore, there are significant numbers of applications of retroreflection in the processing of electromagnetic signals as well as in non-signal applications in which it would be advantageous to have retroreflected electromagnetic radiation arrive at its source with as great an areal density as possible.

It is an object of this invention to provide retroreflecting apparatus which increases the areal density of reflected radiation over that which can be achieved with the known corner cube retroreflectors. It is a further object to provide such apparatus which is inexpensive to fabricate and reliable in operation. Another object is to provide a reflector capable of returning electromagnetic radiation back to its source such that at some increment of time the intensity of the reflected radiation impinging on the source is substantially equal to that impinging upon the reflector. Still another object is to provide an array of such retroreflectors which may be mounted on the potential target of a high powered laser weapon, which array protects the target from damage and reflects the laser light impinging upon it back toward the laser weapon.

SUMMARY OF THE INVENTION

The apparatus for reflecting incident radiative energy back to a source according to the present invention features at least two intersecting planar reflecting facets mounted for the continuous adjustment of the angle between the adjacent facets. Apparatus is provided for synchronously oscillating the facets to sweep the angle between the adjacent facets between $\pi/2$ and $\pi/2 - \delta$ radians. The angle $\delta$ is selected to cause the plane of maximum areal radiative density to cross the plane including the source of the radiation. Preferred embodiments include two and three facet configurations. In the two-facet case one or both of the facets may be mounted for oscillation. For the three-facet configuration all three facets may be oscillated, or one may be fixed and the other two oscillated to cause the plane of maximum areal density to cross the plane including the source. In these embodiments driving apparatus is provided for oscillating the facets. Equipment is also provided for detecting the displacement of the facets, and a closed loop automatic control system responsive to the facet displacements is provided for controlling the driving apparatus so as to oscillate the facets in phase.

BRIEF DESCRIPTION OF THE DRAWING

The invention disclosed herein may be understood better with reference to the drawing in which various dimensions are exaggerated for clarity.

DESCRIPTION OF THE PREFERRED EMBODIMENTS

Figure 1:
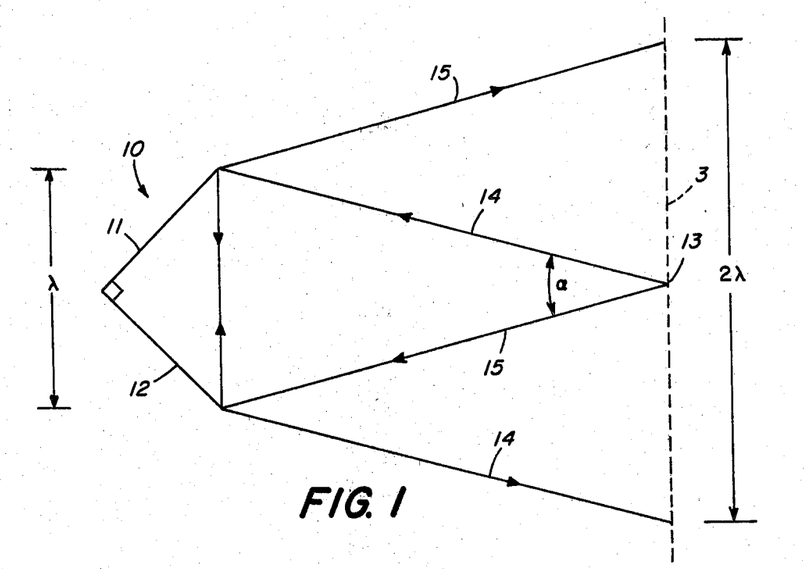
FIG. 1 is a diagram illustrating the dispersion that occurs with corner reflectors.

The dispersion resulting from conventional retroreflectors will first be explained with reference to FIG. 1. As I have shown in my previous U.S. Pat. Nos. 4,082,414 and 4,160,577, the disclosures of which are incorporated herein by reference, if a retroreflector is made of three reflecting surfaces each aligned precisely at right angles to the other two, then the electromagnetic energy that the retroreflector receives from a point source is reflected toward the source and arrives at the plane of the source as a beam of radiation, the diameter of which is precisely twice as large as the aperture of the retroreflecting cell as seen from the source. Thus, the areal density of reflected radiation at the source is one-fourth of that at which the energy struck the aperture of the retroreflector. FIG. 1, for simplicity, illustrates the dispersion effect for a two dimensional case. In the figure, a retroreflector designated generally at 10 features two planar reflecting surfaces 11 and 12 aligned precisely at an angle of $\pi/2$ with respect to one another. The aperture of the retroreflector 10 is $\lambda$. The retroreflector 10 is illuminated by a point source of radiative energy 13 in a plane 3. A ray 14 from the source 13, which just intersects the surface of facet 11, is reflected to the facet 12. From the facet 12, the ray 14 is reflected in a direction exactly parallel to the incident ray 14 from the source 13. Similarly, a ray 15 from the source 13 strikes the facet 12, is reflected to the facet 11, and thereafter travels in a path parallel to its original direction. When the two rays 14 and 15 return to the plane of the source 13, the width of the beam between the ray 14 and the ray 15 is $2\lambda$, that is, twice the aperture of the retroreflector 10 as viewed from the source. For a three dimensional retroreflector the width of the beam also doubles at the plane 3 of the source 13; the areal energy density will be one-fourth of the density of the beam when it initially interacted with the retroreflector 10. The relationship illustrated in FIG. 1 holds true for all retroreflectors comprising plural facets arranged at precisely 90° angles. That is, no matter how near or far the source is from such a retroreflector, the width of the beam at the plane of the source is twice the width of the aperture of the retroreflector as viewed from the source. In some cases, as where the boundary rays of the beam do not impinge on the edges of the facets, the aperture as viewed from the source may be slightly smaller than the true aperture, and thus the width of the beam at the plane of the source will be somewhat less than twice the width of the true aperture.

Figure 2:
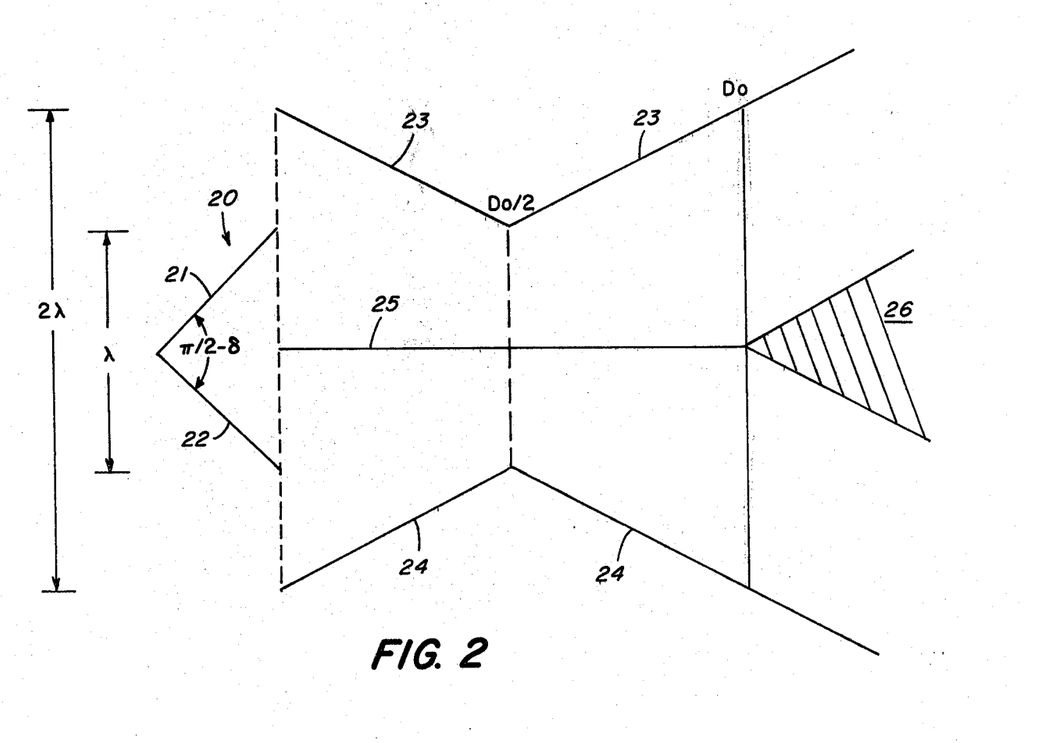
FIG. 2 is a diagram depicting the variation in areal density as a function of the distance from a reflector having reflecting facets intersecting at $\pi/2 - \delta$ radians.

As I have shown in U.S. Pat. No. 4,160,577, the situation changes if the angle between the facets is smaller than $\pi/2$, for example, an angle $\pi/2-\delta$ radians. In such a case any ray that is reflected by both facets will leave after the second reflection on a path that is inclined to the path of the incoming ray at an angle of $2\delta$. As a consequence of this, the dispersion of the reflected beam of energy will depend upon the distance from the source to the retroreflector. This effect is illustrated in FIG. 2. A retroreflector 20, again having two facets for purposes of simplicity of explanations, features reflecting facets 21 and 22 intersecting at an angle $\pi/2-\delta$. The aperture of the retroreflector 20 is $\lambda$. The lines 23 and 24 define the envelope of dispersion of reflected radiation. Each angle $\delta$ defines a critical distance $D_o$ for the two dimensional situation depicted in FIG. 2. The relationship between $\delta$ and $D_o$ is $D_o = \lambda/2 \tan \delta$. $D_o$ is termed a critical distance because for point sources located along the retroreflector axis 25 at a distance of $D_o$ or less, the point source will be illuminated by the reflected radiation from the retroreflector 20. Beyond the distance $D_o$, however, the beam of radiation splits to form an unilluminated umbra 26. At $D_o$ the width of the reflected beam is $2\lambda$, that is, twice the width of the radiation which intersects the retroreflector 20. Thus, for a point source located along the axis 25 anywhere within the distance $D_o$, the areal density will be no less than if the facets of the retroreflector were precisely intersecting at an angle of $\pi/2$.

At a distance equal to $D_o/2$ moreover, the width of the reflected beam is just $\lambda$ so that the areal density at a location $D_o/2$ is equal to the areal density that initially intersects the retroreflector 20. The location $D_o/2$, therefore, is the location of the plane of minimum dispersion of the reflected energy that can be attained with a retroreflector. This figure thus illustrates that if a point source is farther from the retroreflector than the critical distance $D_o$, it may be unilluminated by the reflected energy. In addition, FIG. 2 illustrates the important fact that the areal density of the reflected radiation at a location $D_o/2$ is four times as great as the areal density would be if the facets of retroreflector 20 were aligned at precisely $\pi/2$ radians. As I have shown in U.S. Pat. No. 4,160,577, the critical distance $D_o$ for a three-dimensional, three facet configuration is $$D_o = \sqrt{\frac{3}{2}} \; \frac{\lambda}{2 \tan \delta}.$$

Thus, because areal density is a function of the angle one can exploit these effects to minimize dispersion, that is, to obtain high areal density of the reflected radiation at the plane of the source.

Figure 3:
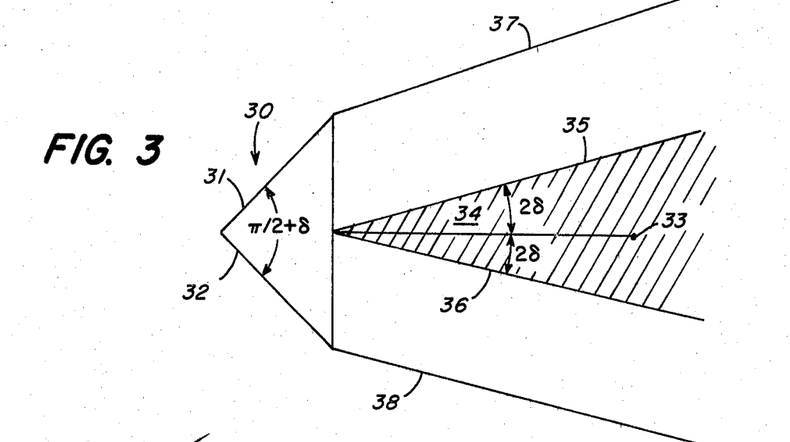
FIG. 3 is a diagram depicting a corner reflector whose facets are at an angle greater than $\pi/2$.

It should be noted that if the angle between the facets of a retroreflecting cell is somewhat greater than a right angle, that is, $\pi/2+\delta$, the reflected beam of energy splits immediately at the retroreflector and an unilluminated umbra extends from the retroreflector itself. In such a case a point source which illuminates the retroreflector with energy might not be illuminated at all by the reflected beam of energy. This situation is shown in FIG. 3. In FIG. 3, a retroreflector 30 features reflecting facets 31 and 32 disposed at an angle of $\pi/2+\delta$ with respect to one another. A point source of radiation 33 remains unilluminated by the reflected radiation because it lies within the umbra 34 defined by the lines 35 and 36. Because the angle between the facets 31 and 32 is greater than $\pi/2$, all of the reflected energy lies in the two beams between the lines 35 and 37 and between the lines 36 and 38.

The magnitudes of the distances and the angular deviations $\delta$ at which the effects shown in FIGS. 2 and 3 take place are of course important in practical applications of retroreflection. Consider, for example, a retroreflector with an aperture of 10 centimeters as might be used as a target on an aircraft or a ship to aid in indentification and in determining position. Assume that the source of electromagnetic radiation which illuminates this retroreflector is 100 kilometers in distance from it. This would be the case, for example, for an object at an altitude of approximately 70 kilometers and at a horizontal distance of 70 kilometers from a radar antenna. For a radar reflector with three reflecting facets, the angle $\delta$ of FIG. 2 for which the split of reflected radiation will occur at the antenna is $8.77 \times 10^{-6\circ}$ or $3.16 \times 10^{-3}$ seconds of arc. If the angle between the facets were less than a right angle by, for example, 5 minutes of arc (the tolerance permitted in standard shop practice), the split of reflected energy would occur at a distance of 0.21 kilometers in front of the reflecting cell, and the width of the unilluminated umbra at the antenna located 100 kilometers away would be approximately 0.29 kilometers. These results follow from straightforward application of the formulae given in U.S. Pat. No. 4,160,577 and the information shown in FIG. 2. Thus, even with an antenna of 100 meters diameter, under these conditions the beam of energy from the reflecting cell would miss the antenna entirely. If the reflecting facets were aligned at 5 minutes of arc more than a right angle, the reflected radiation would also miss the antenna.

The central idea of the invention disclosed herein is to oscillate the reflecting facets in phase so that the plane of maximum areal density sweeps through the source of energy a number of times during the duration of illumination of the reflector by the source. During that part of the oscillation of the reflecting facets in which the source of radiation is at a distance less than the critical distance $D_o$ indicated in FIG. 2, the reflection of energy onto the source is at least as dense as that which would be obtained from a perfectly aligned retroreflector having facets intersecting at precisely $\pi/2$ radians. That is, the width of the reflected beam does not exceed $2\lambda$, which is twice the aperture of the retroreflector. Thus, during at least some part of the period of oscillation of the facets the source will be illuminated. During a significant part of this period, moreover, the areal density of the reflected radiation at the source will be considerably greater than that which would obtain with a retroreflector in which the facets were aligned precisely at right angles. At one point in the oscillation (when the distance from the retroreflector to the source is $D_o/2$ of FIG. 2 or $$\frac{1}{2}\sqrt{\frac{3}{2}} \frac{\lambda}{2 \tan \delta}$$

the reflected energy on the source will have the same areal density as that received at the retroreflector from the source.

This important result may be summarized as follows: For a three dimensional retroreflector having facets precisely aligned at right angles, the source is always illuminated by energy having an areal density one-fourth of that which it had at the plane of the retroreflector. By oscillating the facets, however, between an angle of $\pi/2$ and $\pi/2-\delta$, a source whose distance from the retroreflector is less than the critical distance $D_o$ is illuminated by energy from the retroreflector having an areal density no less than one-fourth of that at the plane of the retroreflector and sometimes having an areal density equal to that at the retroreflector. Thus, over one period of oscillation, the source of the radiation is bathed in significantly more reflected radiation than would be the case for a retroreflector having its facets fixed precisely at $\pi/2$ radians.

Cases in which the source is at a distance greater than $D_o$ of FIG. 2 from a reflecting cell arise in two ways: first, the source may be at this range from the retroreflector during part of the period of oscillation of the reflecting facets; second, the source will always be at this range from the retroreflector if the angle between the facets is greater than a right angle. The effect of this circumstance depends upon the actual diameter of the source and its actual distance from the retroreflector, as has been considered in the example above. There are instances in which the source can receive reflected energy from the retroreflector even when the axis from the source to the retroreflector is surrounded by an umbra which is not illuminated by the reflected radiation at the plane of the source (e.g., when the source is not a single point source but an antenna which may be considered as an ensemble of point sources). For such cases (D greater than $D_o$) the practical significance of oscillating facets is to insure that for some substantial period of time some parts of the source are actually illuminated by reflected radiation even though the source is at a distance greater than $D_o$ of FIG. 2 from the reflecting cell. Since even collimated light beams, e.g., laser beams, in fact exhibit a small amount of dispersion, the reflectors of the invention also have advantages in this area of application.

It should be noted that the ability to vary the areal density of retroreflected energy at the plane of a source by varying the angle between the facets of the retroreflecting cell in an oscillatory fashion enables one to trasmit information. For example, by controlling the temporal character of the oscillation of the facet angles, codes can be transmitted from, for example, an airborne object to a ground station. The ground station can then interpret the temporal fluctuations of areal density of the retroreflected radiation to receive information from the object. The use of such a technique to provide a backup for transponders or as a primary communication system, in view of this disclosure, will be within the skill of the art.

It should also be noted that the ability to vary the areal density of retroreflected energy at the plane of the source has implications for defense against electromagnetic radiation beam weapons such as laser weapons. Thus, an object thought to be a potential target for a high powered laser may be partially or completely covered with one or more retroreflectors, or arrays of retroreflectors having facets which oscillate in phase between $\pi/2$ and $\pi/2-\delta$ radians, where $\delta$ is selected to sweep the plane of maximal areal density between, for example, the maximum and minimum range of the laser. This would result in laser light of substantially equal energy density as impinges on the reflectors impinging back on the laser weapon itself for at least a part of the time during each cycle of oscillation, provided that the direction of the incoming beam were orthogonal to the plane of the face of the reflector (i.e., the plane of the paper in FIG. 4) and that the reflective surfaces had a reflectivity approaching 1.0. If the plane of the reflecting cell or cells were not orthogonal to the incoming beam, then the maximum areal density of reflected energy at the laser source would be somewhat less (as discussed below).

Various additional steps could be taken to further improve this type of protective device such that damage to the laser weapon would be more likely. For example, using conventional technology in combination with the teachings disclosed herein, it will be possible in some cases to include in the protective device means to determine the range and position of the beam weapon and to use this information to electronically orient a protective array and to set the value of $\delta$ to a selected value or a range of values such that the plane of maximal reflected real energy density is substantially coincident with a plane of the laser or sweeps through that plane more often. Similarly, tracking capabilities could be incorporated into the device which would effect an automatic change in orientation of the reflector array and in the amplitude of oscillation of reflector facets in response to the position of the laser. It is also contemplated that the frequency and/or phase of oscillation could be controlled employing conventional techniques so that the facets of the reflector would be at a suitable angle at the time of reflection to achieve the effect sought.

The oscillation of the angle between reflecting facets of a retroreflecting cell can be effected by moving two of the three reflecting facets in phase relative to a fixed third facet. Also, all three facets can be oscillated in phase to produce the same result, but by oscillating only two of the three one can attain this result more simply. For the case of two reflecting facets it is clear that one can remain fixed and the other one oscillated.

Figure 4:
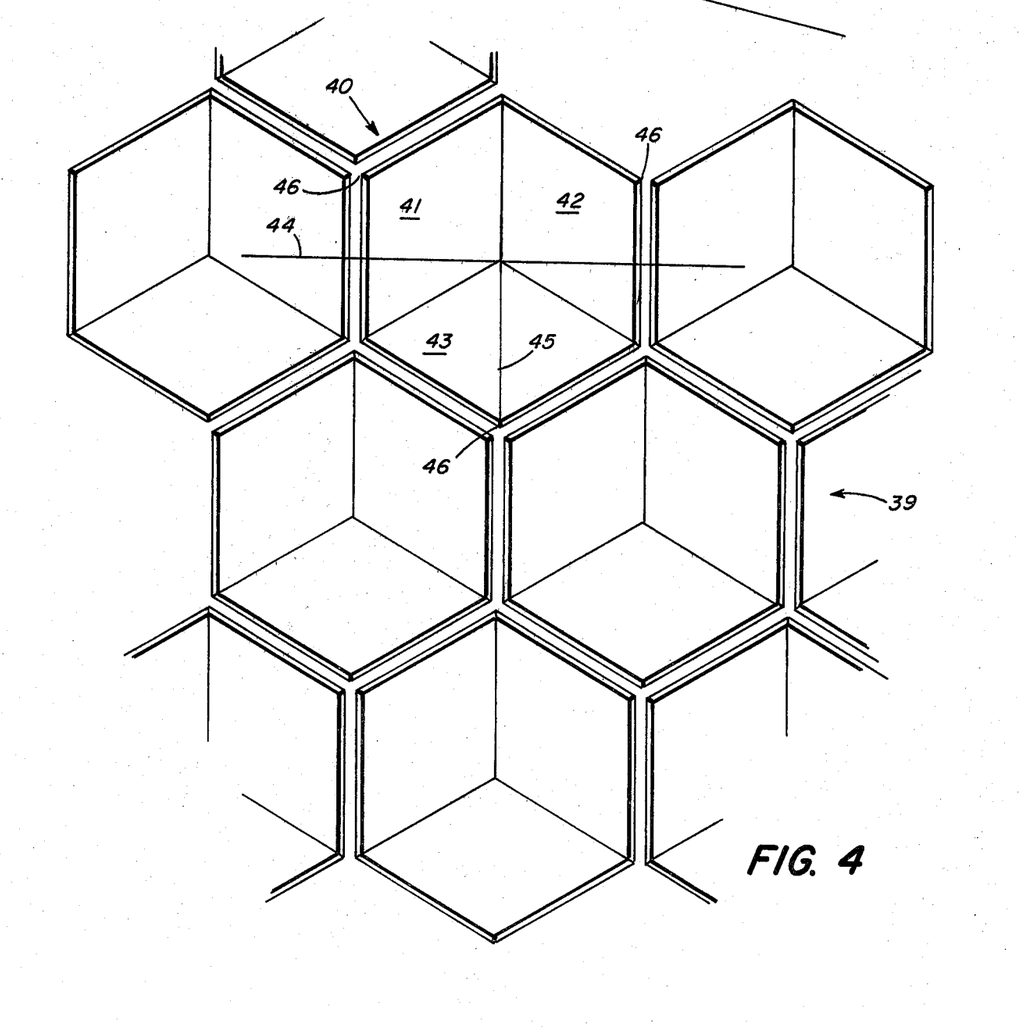
FIG. 4 is a diagrammatic representation of an array of corner retroreflectors each of which comprise three planar facets with the planes of the facets intersecting.

Referring now to FIG. 4, the case in which all three reflecting facets are oscillated is illustrated. Shown in FIG. 4 is a retroreflecting cell 40 in an array 39 of identical cells. Cell 40 comprises three reflecting intersecting facets 41, 42 and 43. The facet 43, for example, is oscillated as a rigid plate so that it rotates about an axis 44 which is perpendicular to a diagonal 45 of the facet 43. A tip 46 of the facet 43, as seen in FIG. 4, appears to undergo displacement toward the center of the hexagonal frontal figure of the retroreflector 40. Similarly, the facets 41 and 42 rotate about axes (not shown) perpendicular to their diagonals.

As the three facets 41, 42 and 43 rotate simultaneously about their axes of rotation so that the displacements at their tips all have the same magnitude, the angle between each pair of facets in the reflecting cell changes by the same amount provided that the three angles are equal at the outset of the facet motion. That is, each facet is rotated about an axis orthogonal to the diagonal of the facet which passes through the center of the cell, and the angle of rotation is the same for each facet. The displacements at the tip of each facet are referred to rather than rotation about the axes, such as 44, because the displacements at the tips may conveniently be used to monitor and control the motion of the facets, as will become more clear below. If the motion of the facets is controlled so that the tip displacements oscillate in unison, then the effect disclosed herein can be attained. As the tips oscillate in phase in some prescribed range, the angles between the reflecting facets vary in unison from about $\pi/2$ to $\pi/2 - \delta$ and then back to $\pi/2$. Thus, the zone of maximum areal density of reflected energy from any point source is swept back and forth along the axis drawn from the retroreflecting cell to the source. With the proper control of the frequency and the maximum magnitude of the tip displacement corresponding to a desired angle $\delta$, one can insure that this zone of maximum areal density of retroreflection falls on the source at some time while the source is illuminating the retroreflector. As noted above, this procedure also insures that during some period during the illumination of the retroreflector by the source, the source itself will be illuminated by reflected energy with an areal density that is at least as great as that which would be obtained from a static retroreflector in which the facets were aligned precisely at right angles. That is, the angle through which the facets are oscillated is selected so that the source of radiation will fall somewhere in the zone D less than $D_o$ of FIG. 2 above, and at some times during that period the source will fall precisely at the plane $D_o/2$ and will thus be illuminated by the same areal density of retroreflected energy as struck the retroreflecting cell.

The previous statement, of course, neglects the effect of absorption of radiation by the facets themselves and scattering from the retroreflector. However, it is assumed that the retroreflecting facets are highly reflective so that absorption is negligible. In this regard, it should be noted that it is within the skill of the art to design reflective surfaces which minimize absorption for essentially any electromagnetic wavelength range. For example, gold films applied to glass can provide specular reflectivity of 0.97 over a broad range of wavelengths.

Figures 5A, 6, 7, 8:
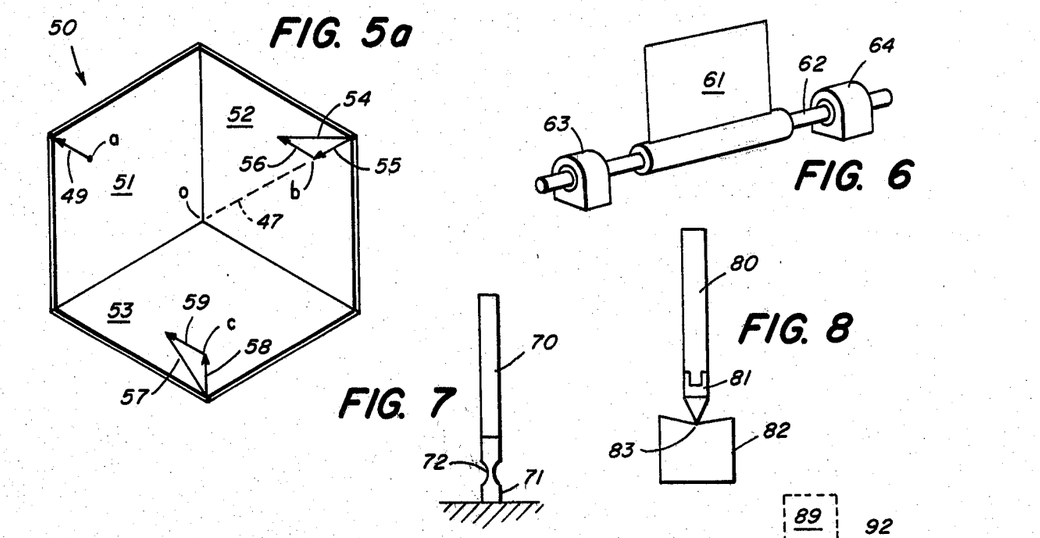
FIGS. 5a and 5b are diagrammatic representations of the motion of two facets.
FIG. 6 is a schematic, perspective view of a facet mounted for oscillation.
FIG. 7 is a diagrammatic representation of another method for mounting a facet for oscillation.
FIG. 8 illustrates another facet mounting method.

Another way to achieve the results of FIG. 4 is to keep one facet stationary and oscillate the other two facets so that the relative displacements of the three facets are precisely the same as the displacements in the cell of FIG. 4. FIG. 5a illustrates the required displacements. FIG. 5a shows the reflecting cell in a plane perpendicular to the initial axis of symmetry of the reflecting cell, i.e., the axis of symmetry of the cell before the facets are displaced. The desired displacement of the two facets 52 and 53 may be derived by an analytical construction having two steps.

First, each facet may be rotated, as a rigid plate, about an axis of rotation that passes through the center of the cell (designated by O in FIG. 5a) and which lies in the plane of FIG. 5a, perpendicular to the diagonal (e.g., 47) of the facet. The rotation of each facet displaces the tip of each facet, uniformly, toward the axis of symmetry of the cell. In this motion the tip of facet 51 moves to the point a, that of facet 52 moves to point b along vector 55, and that of facet 53 moves to point c along vector 53. Also, during this motion the axis of symmetry of the cell remains stationary. At the completion of this motion the facets are in the same relative positions as the facets in FIG. 4 after maximum displacement.

Next, one may hold the relative positions of the three facets fixed and rotate the whole assembly of the reflecting cell as a rigid body so that facet 51 is restored to its original location. During this motion, the tip of facet 51 moves from the point a back to its original location along vector 40. The tip of facet 52 is displaced along the vector 56. The displacement 59 of the tip of facet 53 follows the same rule. Note that in this second motion the axis of symmetry of the reflecting cell does not remain stationary. If the tips of facets 52 and 53 are displaced along vectors 54 and 57, respectively, the desired result is achieved.

Figure 5B:
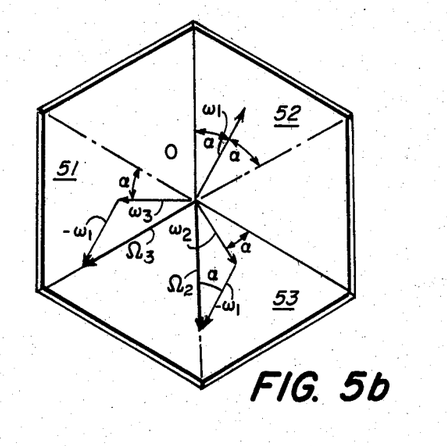

A simple method for constructing a one-step process of displacing facets 52 and 53, to achieve the final result of the displacements indicated in FIG. 5a, is shown in FIG. 5b. This method may be applied when the displacements of the facets are very small compared with their dimensions. The figure shows three vectors, $\omega_1$, $\omega_2$ and $\omega_3$, that represent the rotations which the three facets undergo during the first step of the two-stage motion described above. The vector $\omega_1$ represents the rotation of facet 51; it passes through the center of the cell, O, and lies in the plane of the figure. It is perpendicular to the diagonal of facet 51. The vector $\omega_2$ represents the rotation of facet 52, and $\omega_3$ represents the rotation of facet 53. Both $\omega_2$ and $\omega_3$ also lie in the plane of the figure. The three rotations are symmetrically distributed as shown in the figure. The angle $\alpha$ equals 30°. In the two-step process of motion described above, first each of the facets is displaced through the rigid rotation indicated by its rotation vector; then the entire retroreflecting cell is subjected to a rotation equal to minus $\omega_1$. This restores facet 51 to its original location. Providing that the rotations may be regarded as infinitesimal, the total motion of facet 52 may be regarded as a single rotation equal to $\omega_2 - \omega_1$; the motion of facet 53 can similarly be regarded as a single rotation equal to $\omega_3 - \omega_1$. FIG. 5b shows these rotations. From the symmetry of these rotation vectors one can see that the total rotation of facet 52, which is designated in FIG. 5b by $\Omega_2$, lies in the plane of the figure, passes through the center of the cell, O, and lies in a plane that is perpendicular to the plane of the figure and that includes the projection of the original position of the edge between facets 52 and 51 onto the plane of the figure; the rotation of facet 53, $\Omega_3$, is similarly constructed. Thus, if the rotations of the facets are small, the total rotation of each of these two oscillating facets amounts to in-phase oscillating rotation, of equal magnitude, about an axis that lies along the projection of the fixed facets onto the plane through the center of the cell, O, and orthogonal to the initial axis of symmetry of the cell, i.e., the axis of symmetry in the undeflected configuration.

When the facets 52 and 53 are rotated about axes constructed as specified above so that the two facets rotate simultaneously by the same angle at all times, then, provided the three facets were originally aligned at right angles, the same effect as oscillating all three facets as shown in FIG. 4 and discussed above will be attained.

Having specified the axes of rotation of the facets, a discussion of the mechanisms by which the facets are made to move and the construction of the facets themselves will be presented. The facets which move, for example, the facets 52 and 53 of FIG. 5, should be made of very stiff, lightweight material. This is desirable so that the facets remain planar as they oscillate. In particular, care should be taken to avoid the development of flexural waves in the facets themselves in response to the oscillatory motion that will be forced upon them. Among the materials well suited for construction of the light, stiff plates making up the facets are graphite fiber reinforced polymers or graphite fiber reinforced light metals.

It should also be noted that the facets cannot be precisely square or rectangular. They should be shaped so that the edges of the three facets will not interfere when the tip displacements attain their maximum amplitude. This can be achieved, for example, if each facet is shaped as a rhombus, as a trapezium having a single right angle at tip 46 (FIG. 4), or if each facet approximates these shapes. The shape of the facets should preferably also be such as to fill as much space as possible when the facets are in their undeflected position. In most applications of interest, as will be appreciated from this disclosure, the amplitude of oscillation is quite small, and thus the facets need not depart very much from a square configuration. The nearly square configuration, as noted in the copending application noted above, may be preferred for reasons of convenience in constructing an array of cells and also for minimizing scattering. Undersized square facets may be used. These offer the advantage of low production costs.

The mechanism for oscillating the facets should include means to constrain the motion of the facets such that they rotate only about the axes prescribed above. The mechanism should also provide for coordination of the motion of the facets so that they oscillate in phase, and for control of the amplitude of displacement so that each facet which moves is displaced by the desired magnitude. These requirements can be met through various combinations of techniques that are well known and widely applied. Non-limiting examples of such techniques are described below.

To mount the moving facets so that they rotate only about the desired axes one can use any one of several conventional techniques. One technique would be to mount each facet on a ground and polished shaft through precision bearings. This arrangement is shown in FIG. 6. A facet 61 is mounted on a polished shaft 62. The shaft 62 is constrained in the bearing blocks 63 and 64. In this manner, the facet 61 is constrained to rotate about the axis defined by the shaft 62. Another supporting technique is shown in FIG. 7 wherein a facet 70 has its bottom edge mounted on a strong, flexible plate 71 which has been thinned deliberately at 72 to form the desired axis of rotation. In this configuration, the strong, flexible plate 71 serves as an elastic hinge. It should be noted that in designing such a hinge care must be exercised to avoid fatigue. Yet, another mounting technique is shown in FIG. 8 which illustrates a facet 80 attached to a hardened material 81 defining a knife edge 83. The knife edge 83 mates with a hardened block 82 thereby providing an axis of rotation for the facet 80.

One can use a variety of electromechanical devices to drive and control the facets for in-phase oscillation. For example, one may use a small induction coil as in an audio speaker to drive each facet. By driving each such coil with a common signal one ensures that the driving force applied to each facet is the same. Also, one can use an inductive/capacitive system to provide the spring or restoring force for the oscillation of each facet. Either inductive/resistive systems or capacitive/resistive systems may be employed to provide damping. And finally, one can use electrical displacement detectors, such as capacitive or inductive detectors, to monitor the displacements of the facets.

Figure 9:
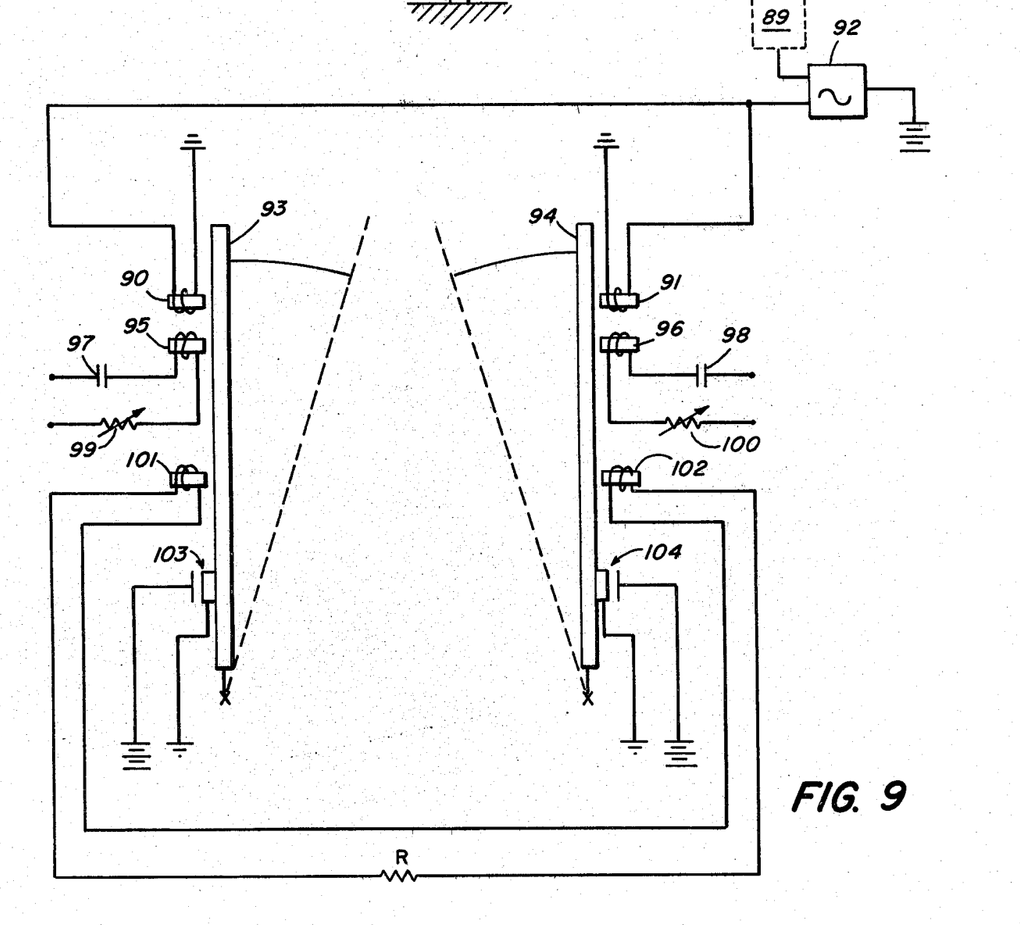
FIG. 9 is a schematic diagram showing the drive and control means for oscillating a pair of facets in phase.

One embodiment of a control system for oscillating the facets in phase is shown schematically in FIG. 9. The facets 93 and 94 are driven by inductive coils 90 and 91, respectively, energized by a signal generator 92 which applies a common signal to the coils 90 and 91. The signal generator 92 may also include means 89 for generating an information signal to modulate the otherwise purely sinusoidal motion of the facets to transmit information, or to modify the frequency or amplitude of oscillation for the purposes noted above. The inductive coils 90 and 91 apply forces to the facets 93 and 94 by means of magnets (not shown) attached to the respective facets. It, of course, is to be understood that alternatively one could place the induction coils 90 and 91 on the moving facets and have the magnets remain stationary. The inductive coils 95 and 96 are used to provide the restoring force or spring force on the facets 93 and 94. This restoring force is generated by the interaction of the capacitors 97 and 98 with the respective inductive coils 95 and 96. Variable resistors 99 and 100 are provided for the purpose of damping the oscillations. Coils 101 and 102 are provided for coupled damping of the facets 93 and 94. These two coils are connected through the large damping resistor R. If the facets 93 and 94 were to move out of phase (for example, both facets moved to the right in FIG. 9) then additive currents would be generated thereby resisting such out of phase motion. On the other hand, when the facets 93 and 94 are moving in phase, the respective signals cancel one another out thereby generating no force. This coupled damping thus minimizes out of phase oscillations of the facets 93 and 94. The displacements of the respective facets 93 and 94 are detected by means of the capacitive pickups 103 and 104. In this case, one plate of the capacitor is mounted on the facet, and the other plate is stationary.

It should be emphasized that any automatic closed loop control system will be suitable for oscillating in phase the two facets 93 and 94 of FIG. 9 and that other drive/control systems can be devised. In any such system, it is preferred that the respective displacements be measured, and this information used to control the driving means which actually oscillates the facets. Such an automatic closed loop control system can also be adapted for modulating the motion of the facets while keeping them in phase so as to transmit information. That is, instead of merely driving the facets so that they have purely sinusoidal motions, the oscillations can be modulated so that the areal density of reflected energy at a source of radiation varies and information can be transmitted to the source of the radiation from the retroreflector.

The foregoing discussion of exemplary methods of mounting, driving, and controlling the oscillating facets is directed to a two-faceted reflecting cell for purposes of simplicity of explanation. In a three-dimensional cell such as those illustrated in FIG. 4 and FIGS. 5a and 5b, the same principles of mounting and control may be employed. However, the portion of the structure between the pivot point and the plate upon which the reflective facet is mounted must be bent or otherwise fixtured so that each facet oscillates about its proper axis, e.g., $\Omega_2$ in FIG. 5b. As will be apparent from the foregoing discussion, this modification will be required in the situation where two of three facets are mounted for oscillation because each facet's axis of rotation lies outside of the plane of the facet.

Figure 10A:
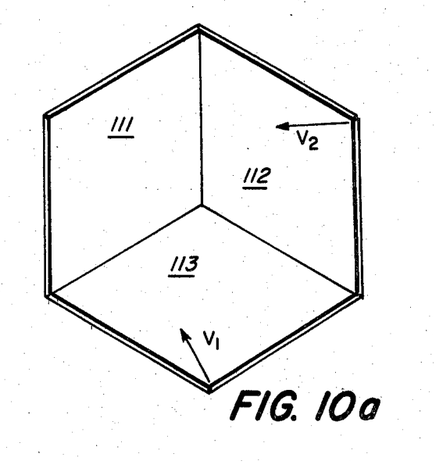
FIGS. 10a-10d are diagrams illustrating how areal density changes as a function of time.
Figure 10B:
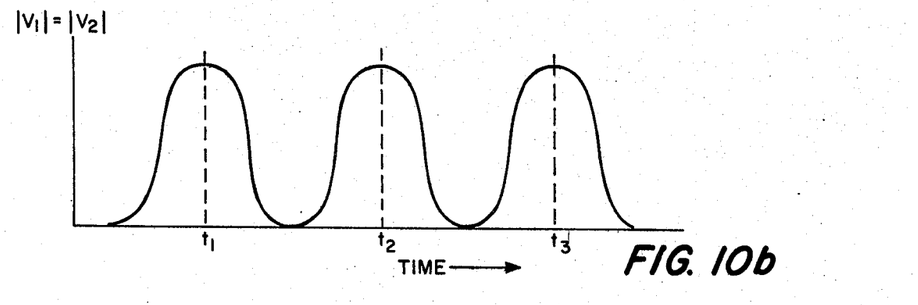
Figure 10C:
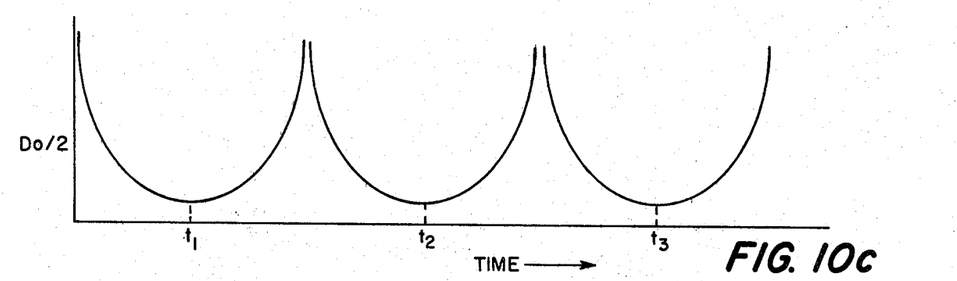
Figure 10D:
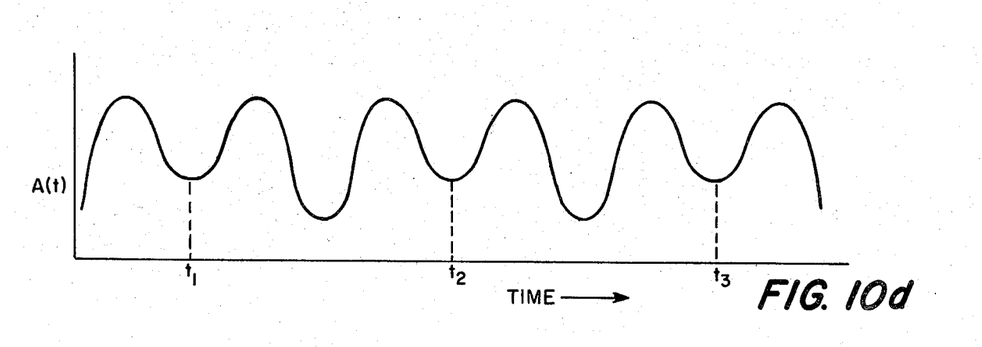

FIGS. 10a-10d are provided to make explicit the performance of the oscillating retroreflector disclosed herein. FIG. 10a shows a retroreflector 110 comprising a stationary facet 111 and oscillating facets 112 and 113. The vector $V_1$ represents the displacement that the tip of the facet 113 undergoes, and the vector $V_2$ represents the displacement that the tip of the facet 112 undergoes. FIG. 10b shows the amplitudes $V_1$ and $V_2$ as a function of time illustrating that the facets oscillate in phase and with the same amplitude. At each instant of time during the oscillation of the facets the plane at which a source will be illuminated by the retroreflected energy with maximum areal density is located at a different distance in front of the retroreflecting cell. FIG. 10c is a graph of the location of the plane of maximum areal density $D_s/2$ as a function of time. For a source of radiative energy located at a fixed distance in front of the retroreflecting cell, the areal density will oscillate as a function of time. This relationship is shown in FIG. 10d. In this figure, A(t) represents the areal density at the retroreflector.

It is to be emphasized that by increasing the areal density of retroreflected energy at the plane of its source, one can overcome to a significant degree the effects of scattering in signal processing and other retroreflector applications. As shown in the patents mentioned above, scattering is the most important single effect in reducing the energy that can be retroreflected to any point source. Scattering occurs when radiation entering the retroreflecting cell does not make three full reflections and it is strongly influenced by the alignment of the source and the cell. For example, if the axis from the point source to the retroreflecting cell is inclined at approximately 20 degrees to the axis of symmetry of the cell, that is, the axis orthogonal to the plane of FIG. 4 or 5, then approximately 50 percent of the energy that falls upon the cell will be scattered off into space rather than returned toward the source. As noted above, in optical ranging at moderately large distances (10 kilometers to 100 kilometers) the effects of dispersion can leave an antenna unilluminated by reflected energy even when the reflector is perfectly aligned toward the source. When, on top of this, scattering reduces the energy that is actually returned toward the source, it is useful in certain applications to use the oscillatory technique disclosed herein to increase the areal density of energy reflected back to the source. For example, with the source and reflecting cell misaligned by 20 degrees, as suggested above, the oscillation of the facets could brighten the reflected image at the source so that the areal density of reflected radiation at the plane of the source would be twice as great at certain times during facet oscillation as could have been achieved with a fixed facet retroreflecting cell perfectly aligned toward the source.

Throughout this specification I have discussed point sources of radiation. In almost every case of practical importance, finite sources of radiation, for example, nearly collimated sources of light, radar antennae, etc., can be considered as assemblies of point sources. A possible exception to this may be a perfectly collimated laser; but, even in laser ranging, the laser exhibits considerable divergence. For example, in laser ranging to the moon the diameter of the laser beam on earth is a few millimeters but by the time it reaches the moon it has spread to several kilometers. In such cases, therefore, the source can still be considered as a point source with diverging radiation. Even when the radiation arrives at the retroreflecting cell perfectly collimated, the effects described above occur, and, in general, it is preferable to use a retroreflector in which the facets are deliberately placed at an angle somewhat less than 90 degrees rather than to use a cell in which it is attempted to align the reflecting facets precisely at 90 degrees. The small errors of alignment in manufacturing that inevitably arise will have detrimental and unknown effects on the performance of such a cell. As I have stressed above, if the facets of the cell are oscillated appropriately, the effects of dispersion are not only compensated for, but in addition they are compensated for in a way that can be predicted in advance and therefore controlled.

It is thus seen that the objects of this invention have been achieved in that there has been disclosed a retroreflector the facets of which are oscillated so that the plane of maximum areal density sweeps back and forth through the plane including the source of the radiation. In this way, more energy is reflected to the source than would be the case if the retroreflector consisted of fixed facets precisely aligned at right angles to one another.

It is understood that variations and modifications of the invention disclosed herein will occur to those skilled in the art. It is intended that such variations and modifications are included within the scope of the appended claims.

What is claimed is:

1. Apparatus for reflecting incident radiative energy back to a source comprising:
    at least two planar reflecting facets, the planes of which intersect at an angle, said facets being mounted for adjustment of the angle between adjacent facets; and
    means for oscillating said facets in phase to sweep said angle between about $\pi/2$ and $\pi/2 - \delta$ radians;

wherein said angle δ is selected to cause the plane of maximum areal radiative density of reflected radiative energy to cross the plane including said source.

2. The apparatus of claim 1 comprising three facets.

3. The apparatus of claim 1 comprising two facets.

4. The apparatus of claim 2 or 3 wherein all said facets are mounted for oscillation.

5. The apparatus of claim 2 wherein said facets are shaped as rhombi.

6. The apparatus of claim 1 wherein said planar reflecting facets comprise specular reflective surfaces.

7. The apparatus of claim 1 wherein said oscillating means comprises:
   (1) driving means for oscillating said facets;
   (2) means for detecting the displacement of said facets; and
   (3) a closed loop control system responsive to said displacements for controlling said driving means to oscillate said facets in phase.

8. The apparatus of claim 1 comprising an array of said facets.

9. Apparatus for reflecting incident radiative energy back to a source comprising:
   three planar reflecting facets, the planes of which intersect at an angle, said facets being mounted for adjustment of the angle between adjacent facets; and
   means for oscillating said facets in phase to sweep said angle between about $\pi/2$ and $\pi/2-\delta$ radians;
   wherein said angle δ is selected to cause the plane of maximum areal radiative density of reflected radiative energy to cross the plane including said source, and
   wherein one of said facets is fixed and the other two of said facets are mounted for oscillation.

10. Apparatus for reflecting incident radiative energy back to a source comprising:
    two planar reflecting facets, the planes of which intersect at an angle, said facets being mounted for adjustment of the angle between adjacent facets; and
    means for oscillating said facets in phase to sweep said angle betwen about $\pi/2$ and $\pi/2-\delta$ radians;
    wherein said angle δ selected to cause the plane of maximum areal radiative density of reflected radiative energy to cross the plane including said source, and
    wherein one of said facets is fixed, and the other of said facets is mounted for oscillation.

11. A retroreflecting cell for reflecting incident radiative energy back to a source located within a distance D from said cell, said cell comprising:
    three planar reflecting facets, the planes of which intersect at an angle, said facets being mounted for adjustment of the angles between adjacent facets, said cell having an aperture λ; and
    means for oscillating in phase at least two of said facets to sweep said angles between $\pi/2$ and $\pi/2-\delta$ radians;
    wherein said angle $$\delta = \tan^{-1}\left[\frac{1}{4}\sqrt{\frac{3}{2}}\,\frac{\lambda}{D}\right].$$

12. A method of reflecting incident radiative energy back to a source comprising:
    (1) providing at least two planar reflecting facets, the planes of which intersect at an angle, said facets being mounted for adjustment of the angle between adjacent facets; and
    (2) oscillating said facets in phase to sweep said angle between $\pi/2$ and $\pi/2-\delta$ radians, wherein said angle δ is selected to cause the plane of maximum areal radiative density to cross the plane including said source.

13. Apparatus for transmitting information to a source of radiative energy comprising:
    (1) means for generating an information signal;
    (2) a retroreflecting cell adapted for reflecting energy emitted from said source back thereto, said cell including three planar reflecting facets, the planes of which intersect at an angle, said facets being mounted for adjustment of the angles between adjacent facets; and
    (3) means for moving at least two of said facets in response to said information signal to sweep said angles in phase between $\pi/2$ and $\pi/2-\delta$ radians;
    the angle δ being selected to cause the plane of maximum areal density to cross the plane including said source whereby the temporal variation in areal density of said radiative energy received at the plane including said source contains the information in said information signal.

* * * * *